United States Patent
Brown et al.

(10) Patent No.: US 7,584,793 B2
(45) Date of Patent: Sep. 8, 2009

(54) METHOD FOR TREATING SUBTERRANEAN FORMATION

(75) Inventors: Derek Brown, Houston, TX (US);
Samuel Danican, Houston, TX (US);
Gregory Kubala, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 91 days.

(21) Appl. No.: 11/754,427

(22) Filed: May 29, 2007

(65) Prior Publication Data

US 2008/0296022 A1   Dec. 4, 2008

(51) Int. Cl.
E21B 43/22   (2006.01)
E21B 43/27   (2006.01)

(52) U.S. Cl. .................. 166/300; 166/308.4; 166/308.5

(58) Field of Classification Search .................. 166/300, 166/308.4, 308.5
See application file for complete search history.

(56) References Cited

U.S. PATENT DOCUMENTS

| | | | |
|---|---|---|---|
| 4,877,894 A | 10/1989 | Huddleston | |
| 5,846,915 A * | 12/1998 | Smith et al. | 507/269 |
| 5,948,735 A | 9/1999 | Newlove | |
| 6,184,184 B1 | 2/2001 | Amin | |
| 6,187,720 B1 * | 2/2001 | Acker et al. | 507/238 |
| 7,066,262 B2 * | 6/2006 | Funkhouser | 166/300 |
| 2006/0037754 A1 | 2/2006 | Funkhouser | |

OTHER PUBLICATIONS

Paper 2006-81—Total Phosphorous Recovery in Flowback Fluids after Gelled Hydrocarbon Fracturing Fluid Treatments—G. Fyten P. House, R.S. Taylor, P.S. Stemler, A. Lemieux—Canadian international Petroleum Conference—Jun. 13-15, 2006.

* cited by examiner

*Primary Examiner*—William P Neuder
(74) *Attorney, Agent, or Firm*—David Cate; Robin Nava; Thomas Mitchell

(57) ABSTRACT

A method is provided for treating a subterranean formation penetrated by a well bore comprising the steps of:
a) forming a phosphate ester gelled hydrocarbon fracturing fluid comprising a liquid hydrocarbon and a an alkyl phosphate gelling agent;
b) adding said fluid a delayed gel breaker,
c) injecting said fluid down a well, and
d) allowing said breaker to break the fracturing fluid gel after an initial delay period and destabilize a metal crosslink in said gel, reducing the volatile phosphorous present in the fluid by at least about 25%.

25 Claims, 2 Drawing Sheets

METHOD FOR TREATING SUBTERRANEAN FORMATION

FIELD OF THE INVENTION

The present invention relates to the art of treating subterranean formations using gelled hydrocarbons, and more particularly, to a method of using delayed breaker chemicals in gelled hydrocarbon fluids to reduce the presence of volatile phosphorous in downstream processing plants and products.

BACKGROUND OF THE INVENTION

Gelled liquid hydrocarbon fluids have been utilized in a variety of treatments for subterranean formations penetrated by well bores, including stimulation activities such as fracturing and/or gravel packing. Such hydrocarbon fluids must have a sufficiently high viscosity to generate a fracture of sufficient dimensions and also to carry the proppant particles into the fracture. Hydrocarbon fluids are frequently gelled by use of phosphate containing gelling agents, particularly phosphate acid ester gelling agents. These agents have been popular because of their effectiveness and comparatively low cost.

One aspect of well treatment processes is the "cleanup", e.g., returning and removing used fluid from the well after the treatment has been completed. Returned fluids are also useful to carry and remove waste materials, excess proppant and the like from the well. Techniques for promoting cleanup often involve reducing the viscosity of the treatment fluid as much as practical so that it will more readily flow toward the wellbore. This is called "breaking" the fluid. Breaking agents, or "breakers" are specific to the type of treatment fluid being used. Gel breakers are commonly used for conventional polymer based fluids used in stimulation and other activities since leaving such a high viscosity fluid in the formation would result in a reduction of the formation permeability and, consequently, a decrease in the well production. The most widely used breakers are oxidizers and enzymes. The breakers can be dissolved or suspended in the liquid (aqueous, non-aqueous or emulsion) phase of the treating fluid and exposed to the polymer throughout the treatment (added "internally"), or exposed to the fluid at some time after the treatment (added "externally"). Breaking can occur in the wellbore, gravel pack, filter cake, the rock matrix, in a fracture, or in another added or created environment. See, for example, U.S. Pat. No. 4,741,401 (Walles et al.), assigned to Schlumberger Dowell and incorporated herein by reference, for a detailed discussion of breaking activities.

Not all undesirable products are removed with the clean up. Some can remain in the well and be dissolved in or carried by the oil produced by the well. In recent years, problems in downstream processing of crude oil have been encountered, such as plugging of the refinery towers which process the hydrocarbons. These plugging problems can cause build up in the refinery towers and their trays, and removal of such plugging requires shut-down of the affected towers. Upon investigation, the plugging materials have frequently been found to be high phosphorous compounds. Such compounds have been identified as being associated with the aforementioned phosphoric acid ester gelling agents. The phosphoric acid gelling agents are believed to contain volatile phosphorous compounds and/or their precursors which release volatile phosphorous compounds into the wellbore fluids and produced oil. The volatile phosphorous material present in the crude oil products delivered to refineries. The phosphorous condenses onto distillation tower trays during refining. This condensation builds up and results in the plugging of those trays. Excess plugging can lead to a shut down of the towers. Further, volatile phosphorous compounds can carry over and contaminate the products produced by the towers.

Because shut-down of plugged refinery towers causes expense in lost time and cleaning procedures, and because contamination of refined products is highly undesirable, it would be advantageous to remove more of the phosphorous compounds with the return treatment fluid, leaving less phosphorous present in the crude oil sent to the refinery.

It has now been found that the addition of certain delayed breaker compounds to a gelled oil crosslinking with phosphorous will break the fluid and that, surprisingly, using certain amounts of such breaking compound will also cause the phosphorous to change from a volatile to a non-volatile form, reducing the amount of free phosphorous carried by the reflow liquid and the well products which can then be responsible for plugging refinery towers. Breakers may be delayed by various means including the use of surface treatments and the like.

SUMMARY OF THE INVENTION

The invention provides a method for treating a subterranean formation penetrated by a well bore comprising the steps of:
 a) forming a phosphate ester gelled hydrocarbon fracturing fluid comprising a liquid hydrocarbon and a an alkyl phosphate gelling agent;
 b) adding said fluid a delayed gel breaker,
 c) injecting said fluid down a well, and
 d) allowing said breaker to break the fracturing fluid gel after an initial delay period and destabilize a metal crosslink in said gel, reducing the volatile phosphorous present in the fluid by at least about 25%.

In one embodiment of the method, the delayed breaker includes a particulate compound selected from the group consisting of alkali metal oxides, alkali metal hydroxides, alkaline earth metal oxides, alkaline earth metal hydroxides, alkali metal carbonates and alkaline earth metal carbonates In one embodiment, the method includes the delayed breaker is formed by subjecting a particulate breaker compound to at least one treatment selected from the group consisting of sintering, hardening, encapsulation, or complexing of the particulate breaker to render it less soluble.

In another embodiment, the delayed breaker changes the pH of the hydrocarbon fluid.

In yet another embodiment, the breaker raises the pH of the hydrocarbon fluid.

In one embodiment, the delayed breaker is a magnesium oxide, which has been treated to operate as a delayed breaker, e.g., by being sintered. In another embodiment, the delayed breaker is added at about 10-80 ppt. i.e., from about 10 parts of the delayed breaker per thousand parts by weight of the fluid to about 80 parts of the delayed breaker per thousand parts by weight of the fluid.

The invention also provides a gelled hydrocarbon fracturing fluid for use in a wellbore comprising a hydrocarbon liquid, a gelled alkyl phosphate gelling agent, and a delayed breaker, wherein the gelled hydrocarbon fluid does not cause or allow undesirable levels of volatile phosphorous compounds to be present in the crude oil, but allows for the removal of such compounds with the return treatment fluid.

In one embodiment of the fracturing fluid, the delayed breaker is delayed by subjecting the breaker compound to a treatment selected from sintering, burning, hardening or complexing treatments.

In another embodiment of the gelled hydrocarbon fracturing fluid, the delayed breaker comprises a compound is selected from the group consisting of alkali oxides, hydroxides and carbonates, and alkaline earth metal oxides, hydroxides and carbonates.

In another embodiment of the method of the invention, the breaker comprises an at least partially sintered magnesium oxide breaker.

DETAILED DESCRIPTION OF THE INVENTION

Figure 1:
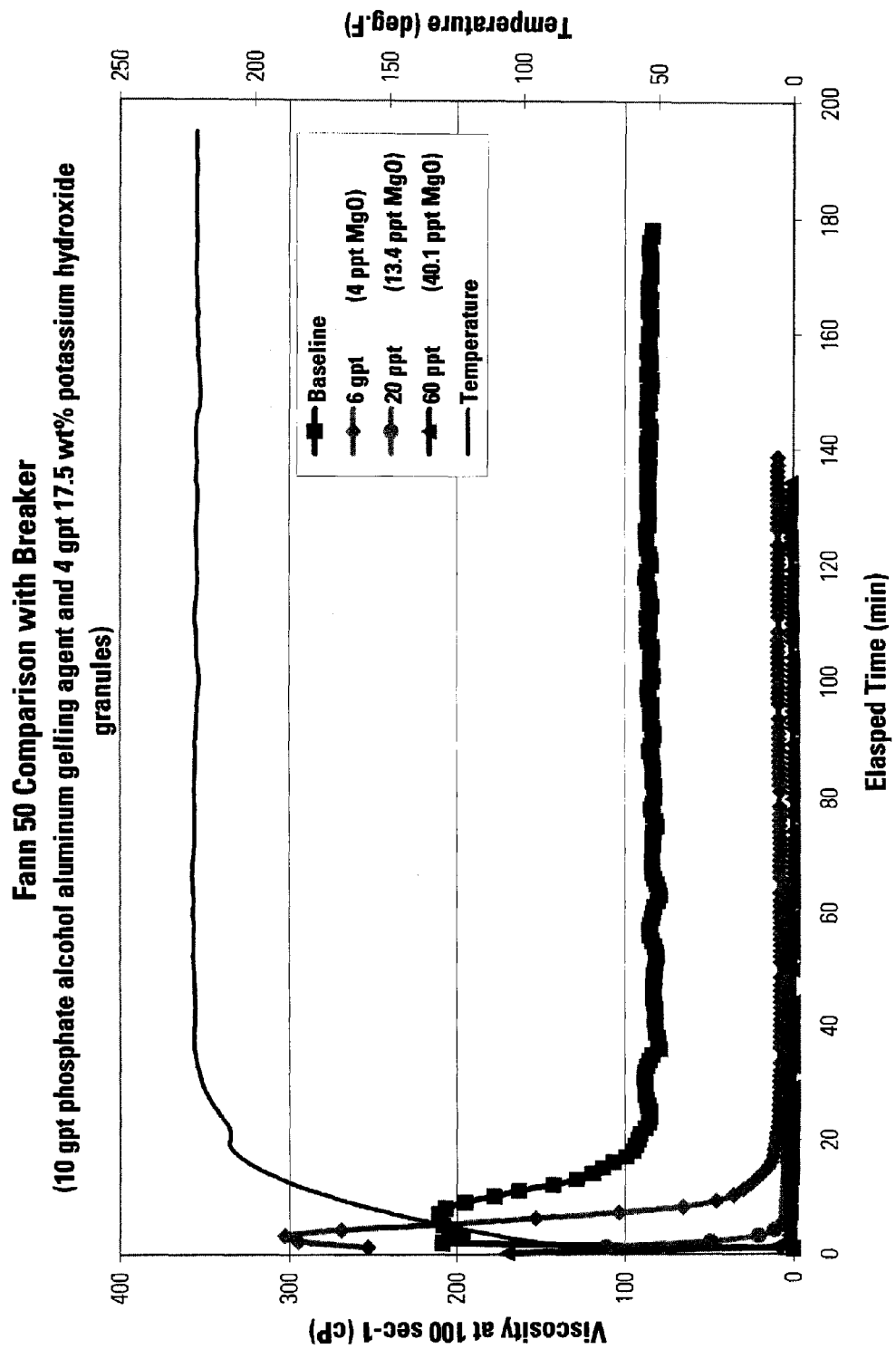
FIG. 1 shows the viscosity of a fluid at 225° F. plotted over time with no additives and with the delayed magnesium breaker of the invention added in two differing amts.

The gelled hydrocarbon fluid comprises any known hydrocarbon liquid such as crude oil, refined or partially refined oil, fuel oil, liquefied gas, alkanes, alpha-olefins, internal olefins, diesel oil, condensates and combinations of hydrocarbons.

The gelled hydrocarbon fluid also includes alkyl phosphate ester gelling agents. Such gelling agents are typically formed from a mixture of primary mono-hydric alcohols having carbon chains of from about 3 to about 18 carbon atoms. The alcohols are reacted with phosphates such as phosphorous pentoxide and/or trimethyl phosphate to produce mono-alkyl, di-alkyl, and/or tri-alkyl esters.

The fluid may also contain gel stabilizers, including but not limited to a source of basic aluminum such as sodium aluminate, aluminum alkoxides or aluminum acetate to assist in formation of the gel structure.

The gel also typically contains proppants. Any desired proppant can be used in the fluid, including plain sand, various other types of silica, resin coated particles (RCPs), microcapsules, bauxite and other granules. The selection of a proppant involves many compromises imposed by economical and practical considerations. Criteria for selecting the proppant type, size, and concentration is based on the needed dimensionless conductivity, and can be selected by a skilled artisan.

The fluid may also contain other enhancers or additives. Optional additives include pH control agents, p For a delayed release of the additive, the breaker may be subjected to a surface treatment such as complexing, hardening or sintering. The breaker may also be encapsulated; if enclosed or encapsulated, the enclosure or capsule may be formed of any suitable coating applied by a process that provides a substantially uniform coating or encapsulation of individual particulate materials between 100 mesh to 5 mesh. By varying the coating thickness, the release characteristics can be varied to a large extent. A shorter release time will be obtained by a thinner coating.

Methods of use of the fluids of the invention include use in a wellbore for fracturing operations, where the gelled hydrocarbon suspension is pumped in from the mixing tanks and into the well bore at a desired fracturing pressure. The fluid is pumped into the formation fractures, and once the fracturing operation is completed, the pressure is released. The hydrocarbon liquid degrades, due to the break, and volatile phosphorous created by the gelling agent is then pumped out with the fracture cuttings and with the crude following the fluid expulsion.

The invention will be further described in the following non-limiting examples.

EXAMPLE

A gelled oil fluid system comprising kerosene, 10 gpt phosphate alcohol aluminum gelling agent and 4 gpt 17.5 wt % potassium hydroxide granules was prepared with different concentrations of magnesium oxide coming from 2 different types of samples (66.8 wt % magnesium oxide; partially burnt/sintered MgO) and magnesium oxide (100 wt % MgO) from MI. The different fluids were conditioned at 225° F. for 3 hours using Fann 50 viscometers before being sent to an analytical lab for distillation and volatile phosphorus content measurement.

Figure 2:
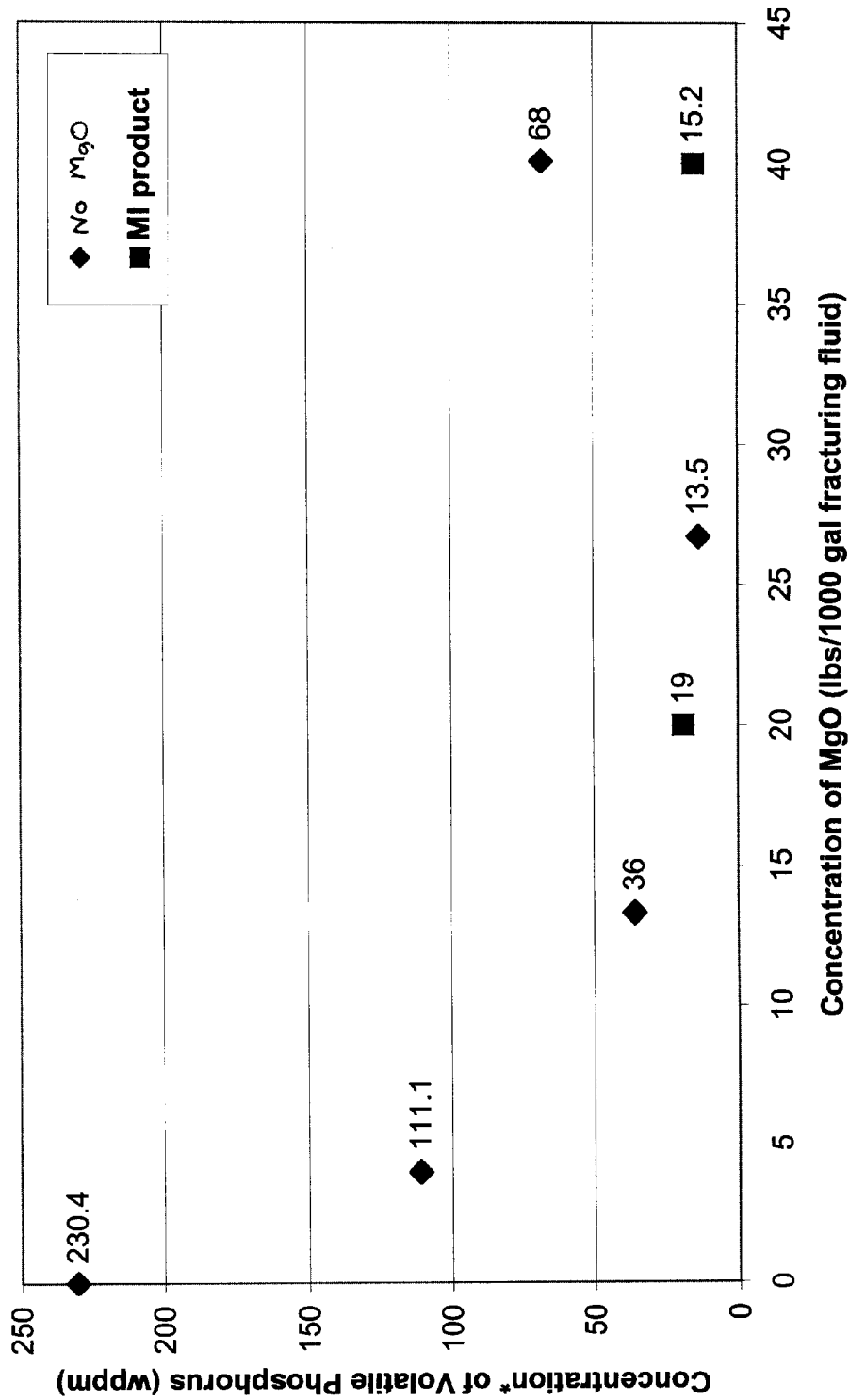
FIG. 2 shows the concentration of magnesium oxide breaker plotted against the concentration of volatile phosphorous.

As FIG. 1 reveals, the magnesium oxide is a good breaker for gelled oil fluids. At 225° F., the break occurs in a few minutes when magnesium oxide is added to the fluid at 13.4 ppt and 40.1 ppt. FIG. 2 demonstrates that magnesium hydroxide not only breaks the gelled hydrocarbon but also significantly contributes to the reduction of the phosphorus content of the gelled oil volatile fraction obtained by distillation of the frac fluid between ambient and 250° C.

As shown by FIG. 2, the volatile phosphorus content of the fluid described above dropped by more than 10 fold when 20 ppt of MgO from MI was used. The diamond shaped points do not contain the MgO in FIG. 2, and the square shaped points do contain the MgO.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention.

What is claimed is:

1. A method for treating a subterranean formation penetrated by a well bore comprising:
   a) forming a phosphate ester gelled hydrocarbon fracturing fluid comprising a liquid hydrocarbon, an alkyl phosphate gelling agent, and a surfactant;
   b) adding to said fluid a delayed gel breaker, wherein the delayed breaker is formed by subjecting a particulate breaker compound to at least one treatment selected from the group consisting of sintering, burning, hardening, or complexing,
   c) injecting said fluid down a well, and
   d) allowing said breaker to break the fracturing fluid gel after an initial delay period and destabilize a metal crosslink in said gel, reducing the volatile phosphorous present in the fluid by at least about 25%.

2. The method according to claim 1 wherein the delayed breaker is formed by subjecting a particulate breaker compound to at least one treatment selected from the group consisting of sintering, burning, hardening, or complexing.

3. The method of claim 1 wherein the delayed breaker comprises a magnesium oxide breaker.

4. The method of claim 3 wherein the delayed breaker is an at least partially sintered magnesium oxide breaker.

5. The method of claim 1 comprising from about 10 parts of the delayed breaker per thousand parts by weight of the fluid to about 80 parts of the delayed breaker per thousand parts by weight of the fluid.

6. The method of claim 1 wherein the amount of volatile phosphorous in the hydrocarbon fracturing fluid is reduced by at least 50%.

7. The method of claim 1 wherein the amount of volatile phosphorous in the hydrocarbon fracturing fluid is reduced by at least 90%.

8. The method of claim 1 wherein said initial delay period is from about 2 minutes to about 20 minutes.

9. The method according to claim 1 wherein the breaker causes a change in the pH of the fracturing fluid over a period of time and concurrently destabilizes a metal crosslink in said phosphate ester.

10. The method according to claim 1 wherein the delayed breaker comprises a particulate compound selected from the group consisting of alkaline earth metal oxides.

11. The method according to claim 1 wherein the breaker is magnesium oxide that has been subjected to a treatment selected from the group consisting of sintering, complexing, hardening and burning.

12. The method according to claim 8 wherein said breaker is magnesium oxide.

13. The method according to claim 1 wherein said hydrocarbon liquid is selected from the group consisting of crude oil, refined oil, diesel oil, fuel oil, condensates, alkanes, liquid petroleum gas, and mixtures thereof.

14. The method according to claim 1 wherein the amount of volatile phosphorous in the hydrocarbon fracturing fluid after breaking is complete is reduced by at least 25%.

15. A method for reducing the volatile phosphorous content of gelled oil fracturing fluid comprising the steps of:
   a) providing a hydrocarbon liquid comprising a hydrocarbon and at least one phosphate ester gelling agent,
   b) providing a particulate delayed breaker to said hydrocarbon liquid to break the phosphate gelling ester, wherein the delayed breaker comprises an at least partially sintered magnesium oxide,
   c) adding said breaker to said liquid,
   d) allowing said breaker to destabilize a metal crosslink in said gel, reducing the volatile phosphorous present in the fluid by at least about 25%.

16. The method of claim 15 further comprising injecting said liquid down a well in a fracturing treatment, wherein the metal crosslink is destabilized downhole after an initial delay period.

17. The method of claim 15 comprising from about 10 parts of the partially sintered magnesium oxide per thousand parts by weight of the fluid to about 80 parts of the partially sintered magnesium oxide per thousand parts by weight of the fluid.

18. A method for treating a subterranean formation penetrated by a well bore comprising:
   a) forming a phosphate ester gelled hydrocarbon fracturing fluid comprising a liquid hydrocarbon and an alkyl phosphate gelling agent;
   b) adding to said fluid a delayed gel breaker, wherein the delayed breaker comprises magnesium oxide which is at least partially sintered,
   c) injecting said fluid down a well, and
   d) allowing said breaker to break the fracturing fluid gel after an initial delay period and destabilize a metal crosslink in said gel, reducing the volatile phosphorous present in the fluid by at least about 25%.

19. The method of claim 18 comprising from about 10 parts of the delayed breaker per thousands parts by weight of the fluid to about 80 parts of the delayed breaker per thousand parts by weight of the fluid.

20. The method of claim 18 wherein the amount of volatile phosphorous in the hydrocarbon fracturing fluid is reduced by at least 50%.

21. The method of claim 18 wherein the amount of volatile phosphorous in the hydrocarbon fracturing fluid is reduced by at least 90%.

22. The method of claim 18 wherein said initial delay period is from about 2 minutes to about 20 minutes.

23. The method according to claim 18 wherein the breaker causes a change in the pH of the fracturing fluid over a period of time and concurrently destabilizes a metal crosslink in said phosphate ester.

24. The method according to claim 18 wherein said hydrocarbon liquid is selected from the group consisting of crude oil, refined oil, diesel oil, fuel oil, condensates, alkanes, liquid petroleum gas, and mixtures thereof.

25. The method according to claim 18 wherein the amount of volatile phosphorous in the hydrocarbon fracturing fluid after breaking is complete is reduced by at least 25%.

* * * * *